United States Patent [19]
Merkt et al.

[11] Patent Number: 5,294,948
[45] Date of Patent: Mar. 15, 1994

[54] DEVICE FOR MACROPHOTOGRAPHY

[75] Inventors: Norbert Merkt; Otto H. Schmidt, both of Herrsching; Anton Schneider, Geisenbrunn, all of Fed. Rep. of Germany

[73] Assignee: Heine Optotechnik GmbH & Co. KG, Fed. Rep. of Germany

[21] Appl. No.: 738,167

[22] Filed: Jul. 30, 1991

[30] Foreign Application Priority Data

Apr. 19, 1991 [DE] Fed. Rep. of Germany ....... 9104808

[51] Int. Cl.$^5$ ............................................. G03B 29/00
[52] U.S. Cl. ................................... 354/62; 354/145.1; 354/295
[58] Field of Search ................. 354/62, 195.1, 195.12, 354/126, 145.1, 295; 362/8, 16; 355/67, 68, 70; 358/98; 128/6

[56] References Cited

U.S. PATENT DOCUMENTS 4,519,684  5/1985  Francis, Jr. et al. ............. 354/145.1

OTHER PUBLICATIONS

Photomed'1, 1988, pp. 27–32.

Primary Examiner—Michael L. Gellner
Assistant Examiner—Howard B. Blankenship
Attorney, Agent, or Firm—Woodcock Washburn Kurtz Mackiewicz & Norris

[57] ABSTRACT

A camera apparatus for macrophotography is provided, having an attachment with a fixed lens, a translucent cap removably attached to the subject-side end of the attachment, and a contact disk or spacer ring attached to the subject-side of the cap and which defines a plane which includes the lens focus. The cap preferably is translucent, permitting flashtube light to be directed from the attachment to the target to be photographed.

1 Claim, 1 Drawing Sheet

DEVICE FOR MACROPHOTOGRAPHY

BACKGROUND OF THE INVENTION

1. Field of the Invention

The invention relates to a device for macrophotography, and, more particularly, an attachment which is fastened rigidly or removably to a camera.

2. Description of the Prior Art

Camera attachments for macrophotography are known in the art. Such attachments are fastened either rigidly or detachably, e.g., by means of a bayonet joint as is usual in the case of interchangeable lenses, to the camera housing.

In the field of medicine, cameras or camera attachments of this type are used for different applications, including for taking detail photographs of the skin.

A camera attachment for dermatological macrophotography is known from PHOTOMED'1, 1988, pages 27-32. This attachment is composed essentially of a bellows lens which is arranged on a support having a front and rear plate, each of which are fastened adjustably on a rail. The lens is directed towards a transparent contact sheet which, for photographing, is placed on the skin after the latter has been moistened with clear oil in order to make the uppermost skin layer transparent.

In the known camera attachment, in order to obtain sharp photographs, the lens must be focused on the skin while looking through the camera viewfinder. As a result of its size and its weight, the attachment is unwieldy and can be used at best only with limitations; with respect to some parts of the body, for example on the side of the nose or in the armpit, it cannot be used at all. The attachment is expensive and, because of the necessity of carrying out focusing and aperture selection for every photograph, prone to error. Furthermore, adjustment of the bellows can create different picture enlargements which make it impossible subsequently to classify the size of detail of the photographed skin region. The attachment, moreover, is composed of a number of components, and requires an electronically controlled camera.

SUMMARY OF THE INVENTION

The object of this invention is to overcome the deficiencies of the prior art, and to produce a camera attachment which, without adjustment devices, provides sharp photographs of constant enlargement; can be manufactured inexpensively; is easy to handle; and is small and of low weight.

According to the invention, this object is achieved by a camera attachment having a lens. A contact sheet, or disk is arranged on the subject-side of the attachment, which disk is designed to be placed against the surface to be photographed.

The camera attachment according to the invention requires no distance adjustment and no aperture adjustment for the lens. Rather, the lens is focused on the outer surface of the contact disk which comes into contact with the subject, and thus with the skin in the event of use in dermatology. This results in a fixed, accurately known enlargement with a constantly sharp picture of the region of skin with which contact is made. Operating devices which are subject to breakdown, which make the camera attachment heavy and make operation by unskilled persons more difficult, are rendered superfluous. At the same time, the size of the camera attachment according to the invention can be kept so small that the photographic device formed with it can be easily handled, and photographs of regions of skin on parts of the body of difficult access are also made possible.

Since the camera attachment advantageously has a lens with a fixed focus, a spacer ring can be fastened as an alternative to the contact sheet, on the subject-side end of the camera attachment, for taking clinical photographs. The subject-side edge of the spacer ring is constructed to lie in the same plane as the subject-side plane of the contact disk.

Either the contact disk or the spacer ring is advantageously arranged on a cap which expediently is removably arranged on the subject-side of the camera attachment. The cap is preferably of conical design and made of translucent material. As a result, the user can make at least an approximate orientation on the region to be photographed, simply with ambient light. The invention also embraces the use of a flash device located in the camera attachment, and with the translucent cap it is possible to establish from outside whether a flash has been triggered.

In a preferred embodiment, an incandescent lamp, which can be switched on from outside, is arranged just back from the cap, for illuminating the subject region and for positioning the photographic device. The incandescent lamp is advantageously a lens tip lamp, the light cone of which is aligned on the subject plane. Means are provided for opening the lens diaphragm simultaneously with switching on the incandescent lamp, in order to increase the brightness during positioning.

In a further preferred embodiment, at least one window is positioned on the subject-side end of the camera attachment, the attachment further accommodating a flashtube behind the window. Advantageously, two elongate windows are provided, which are arranged parallel to one another to each side of the lens, to pass through light from respective flashtubes.

In one embodiment of the contact disk, its outer, or subject-side surface is provided with markings, e.g., with a graduation for direct size determination of details of the region of skin photographed, with limitations—frames, edges, corners, etc.—for trimming, and for marking the center of the picture.

In a further embodiment, the contact disk comprises a color filter for the better differentiation of details of the photographic picture. Likewise, the spacer may have a color filter inserted therein, which filter does not come into contact with the skin.

DESCRIPTION OF THE PREFERRED EMBODIMENT

An exemplary embodiment of the camera and attachment of this invention is explained in the following portion of the specification. It is to be understood that embodiments of equal scope are within the invention as claimed.

Figure 1:
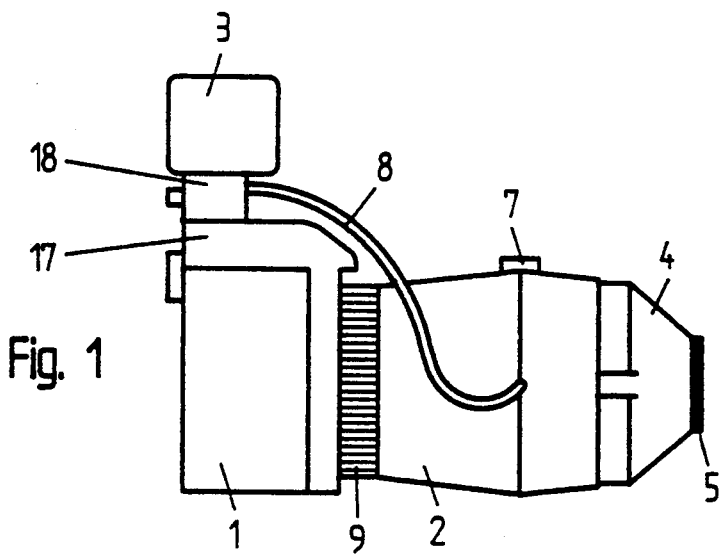
FIG. 1 shows the side view of a camera provided with a camera attachment according to the invention.
Figure 2:
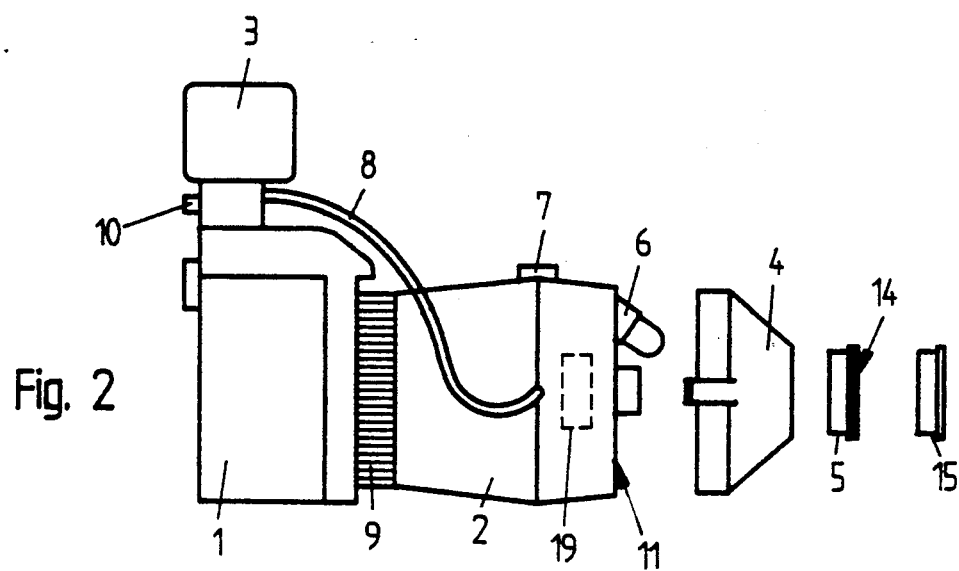
FIG. 2 shows an exploded illustration of the camera in FIG. 1.

The camera arrangement shown in FIG. 1 is composed of a camera housing 1 provided with a flash shoe 17, and a camera attachment 2, in which flashtubes, electronics and optics are accommodated. Fastened to the flash shoe of the camera housing is a battery container 3 with flash contact foot 18 and flash charging button 10. The battery container 3 is connected to the camera attachment 2 by a cable 8. The camera attachment 2 is fastened to the camera housing 1 by means of a bayonet joint 9, all in a known manner.

A removable cap 4 is fastened on the subject-side end 11 of the camera attachment 2. Cap 4 is preferably made of translucent material and has a conical form terminating in a truncated front opening which faces away from the camera attachment 2, toward the target. A contact disk, or sheet 5 is fastened to the cup 4, preferably by an insertion ring within the truncated front edge of cup 4 (not shown), such that the disk is removable. Alternately, instead of disk 5, a spacer ring 15 can be fastened onto the insertion ring. Both disk 5 and spacer ring 15 provide means for defining a front surface to which the camera is focused, and which is placed in contact, or virtual contact, with the object to be photographed. As stated above, either the contact disk 5 or the spacer 15 may comprise a color filter; in the case of the contact disk, the color filter is designed to come into contact with the skin, whereas for the spacer 15, the color filter does not come into contact with the skin.

Arranged on the subject-side end 11 of the camera attachment 2 is a lens tip lamp 6 which is directed towards the disk 5, or the spacer ring 15, and which can be switched on from outside by means of a button 7. The button 7 is suitably connected to a diaphragm drive which opens a lens diaphragm 20 when the lens tip lamp 6 is switched on.

Figure 3:
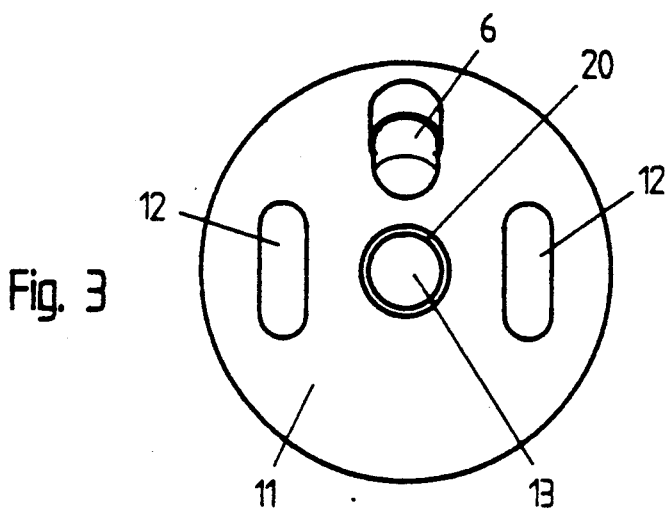
FIG. 3 shows a front view of the subject-side end of the camera attachment in FIG. 2, with the cap removed.

Referring specifically to FIG. 3, it is seen that the subject-side surface 11 of the camera attachment 2 is provided with two elongate openings, or windows 12. A flashtube, indicated diagrammatically at 19, is arranged behind each window 12. The flashtube receives its power from cable 8 in a well-known manner. Light from the flashtubes is transmitted forwardly toward translucent cap 4 to the focal plane of lens 13. Stated above, lens 13 is focused on the subject-side surface 14 of contact disk 5, or alternately, to the plane defined by the subject-side edge of spacer ring 15. Also as described above, the outer, or subject-side surface of the contact disk may be provided with a graduation for direct size determination, and/or may have limitations for trimming and/or marking of the center of the picture.

What is claimed:

1. A camera apparatus for macrophotography, having a camera with a fixed focus lens, said lens being in a fixed position within said attachment, said attachment having a subject-side positioned toward the subject to be photographed, and further characterized by having a contact element arranged on the subject-side end of said camera attachment, said contact element having a subject side surface defining a fixed focal plane corresponding to the fixed focus of said fixed focus lens, said camera apparatus further being characterized by comprising two elongate windows arranged substantially parallel to one another on said subject-side end of said camera attachment, said windows being arranged on respective sides of said lens, and further having a flash tube positioned behind said windows.

* * * * *